US011791481B2

(12) United States Patent
Sakai et al.

(10) Patent No.: US 11,791,481 B2
(45) Date of Patent: Oct. 17, 2023

(54) FUEL CELL SYSTEM

(71) Applicant: HONDA MOTOR CO., LTD., Tokyo (JP)

(72) Inventors: Ryoji Sakai, Wako (JP); Takuto Nakagawa, Wako (JP); Sho Akabori, Wako (JP); Tomoyuki Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 117 days.

(21) Appl. No.: 17/571,853

(22) Filed: Jan. 10, 2022

(65) Prior Publication Data

US 2022/0223883 A1     Jul. 14, 2022

(30) Foreign Application Priority Data

Jan. 14, 2021   (JP) ................................. 2021-004172

(51) Int. Cl.
| | |
|---|---|
| *H01M 8/04119* | (2016.01) |
| *H01M 8/04746* | (2016.01) |
| *H01M 8/0432* | (2016.01) |
| *H01M 8/04537* | (2016.01) |
| *H01M 8/04228* | (2016.01) |
| *H01M 8/04223* | (2016.01) |

(52) U.S. Cl.
CPC ... *H01M 8/04134* (2013.01); *H01M 8/04228* (2016.02); *H01M 8/04253* (2013.01); *H01M 8/04358* (2013.01); *H01M 8/04619* (2013.01); *H01M 8/04768* (2013.01); *H01M 8/04783* (2013.01)

(58) Field of Classification Search
CPC ........... H01M 8/04228; H01M 8/0432; H01M 8/04358; H01M 8/04932; H01M 8/0494; H01M 8/04611; H01M 8/04619; H01M 8/04253

See application file for complete search history.

(56) References Cited

U.S. PATENT DOCUMENTS

2017/0237094 A1     8/2017 Ojima et al.

FOREIGN PATENT DOCUMENTS

| JP | 2014-035820 A | 2/2014 |
|---|---|---|
| JP | 2017-147022 A | 8/2017 |

OTHER PUBLICATIONS

JP 2014035820 English translation. Kikuchi et al. Japan. Feb. 24, 2014. (Year: 2014).*
Office Action dated Nov. 15, 2022 issued over the corresponding Japanese Patent Application No. 2021-004172 with the English translation thereof.

* cited by examiner

*Primary Examiner* — Christopher P Domone
(74) *Attorney, Agent, or Firm* — Carrier Shende & Associates P.C.; Joseph P. Carrier; Fulchand P. Shende

(57) ABSTRACT

An ECU of a fuel cell system determines whether or not temperature information exceeds a temperature threshold for determination when receiving a signal related to power generation stop of a fuel cell stack during operation of a moving body. When the temperature information exceeds the determination temperature threshold, the ECU performs a stop control for stopping power generation of the fuel cell stack. On the other hand, when the temperature information is equal to or lower than the determination temperature threshold, the ECU performs an idle control for generating electric power smaller than electric power consumed by the air pump.

11 Claims, 8 Drawing Sheets

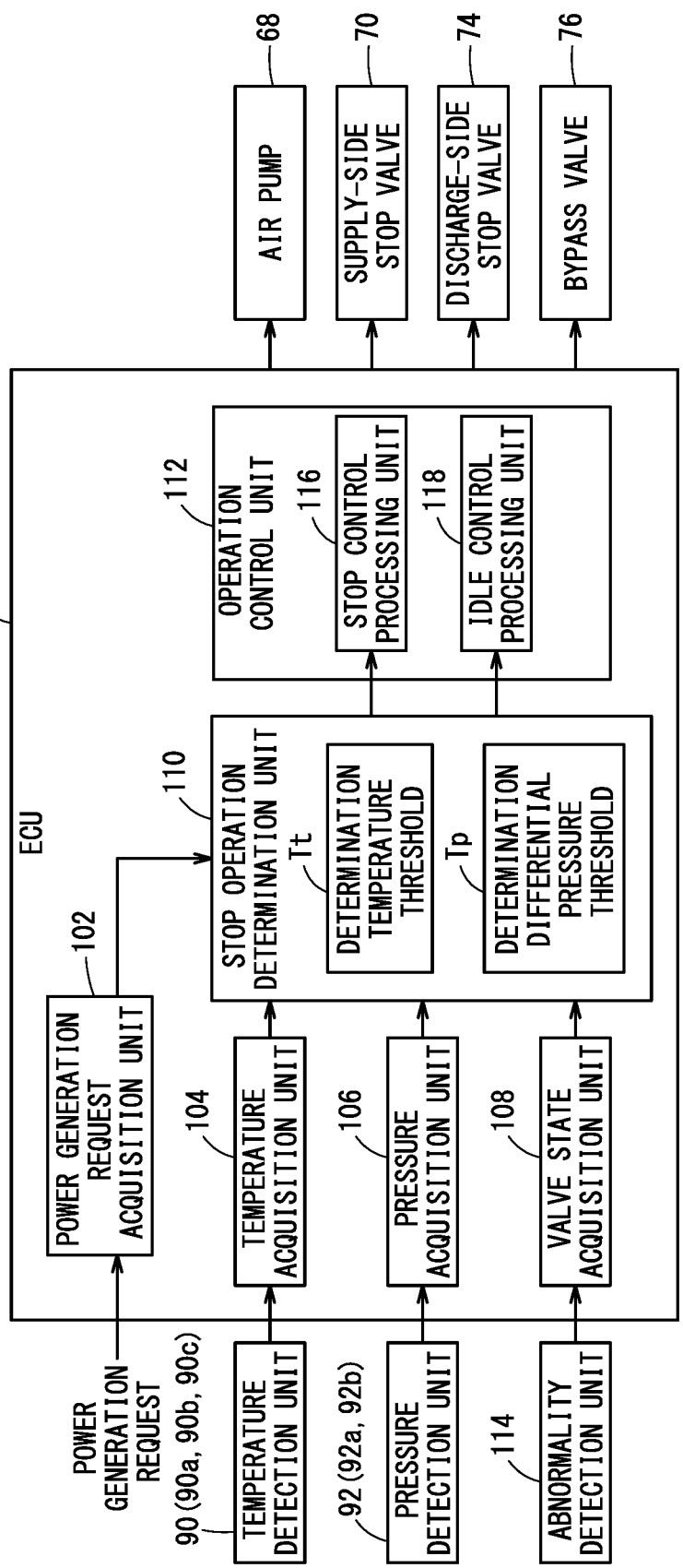

FIG. 3A  STOP CONTROL
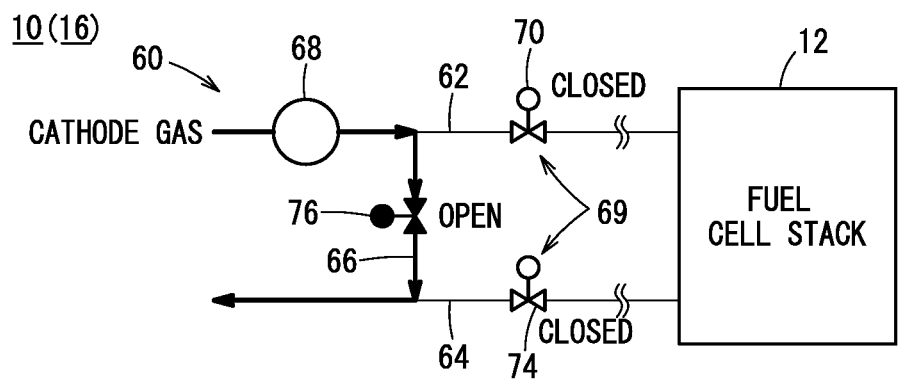
FIG. 3B
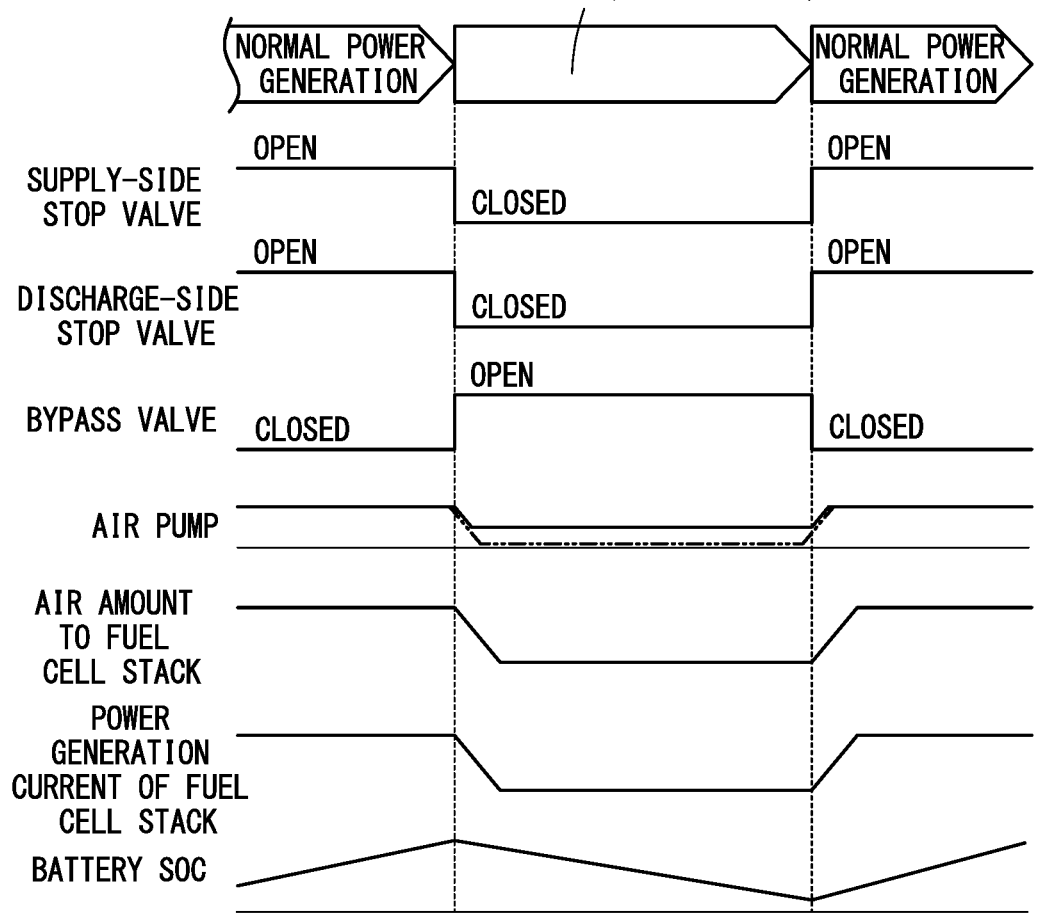

FIG. 4A  IDLE CONTROL
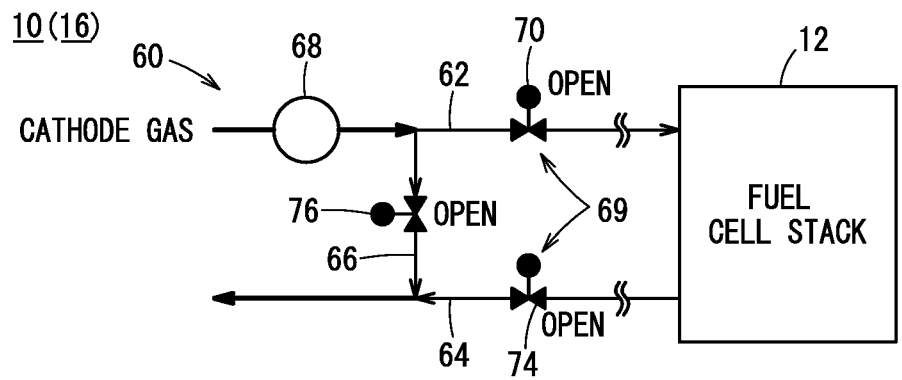
FIG. 4B
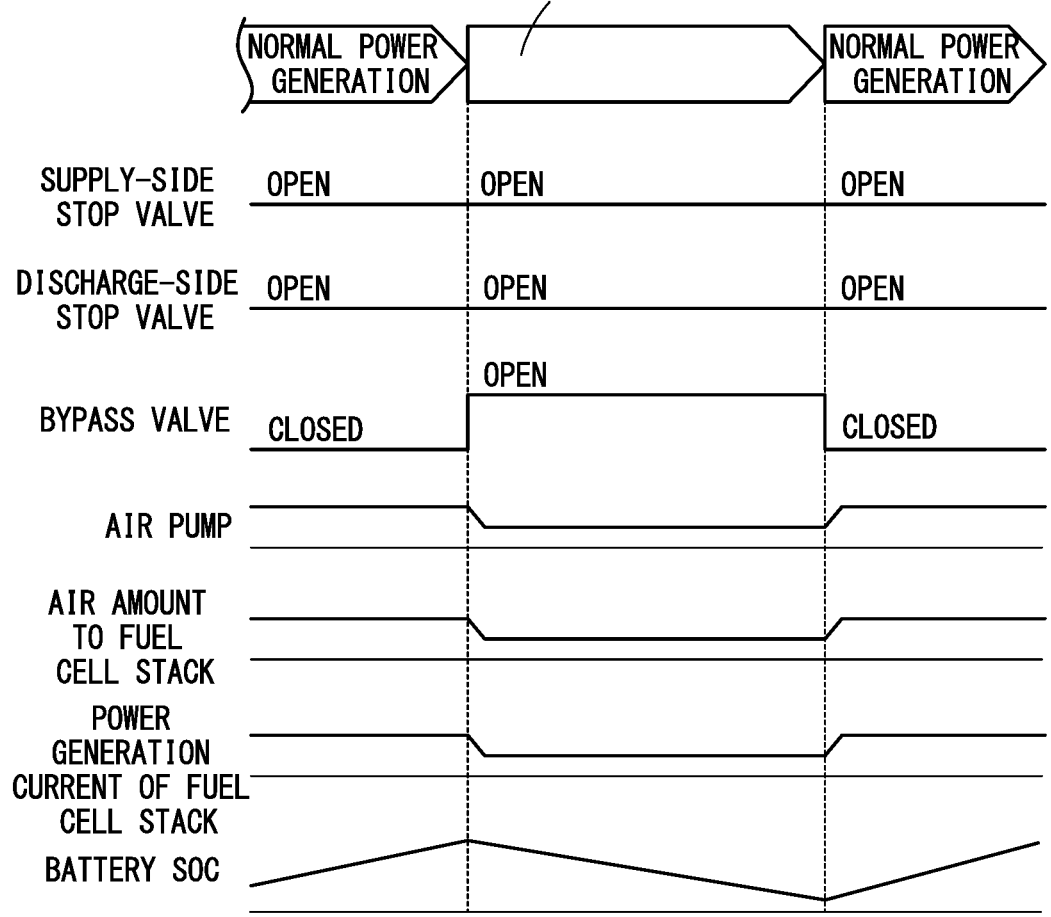

FUEL CELL SYSTEM

CROSS-REFERENCE TO RELATED APPLICATIONS

This application is based upon and claims the benefit of priority from Japanese Patent Application No. 2021-004172 filed on Jan. 14, 2021, the contents of which are incorporated herein by reference.

BACKGROUND OF THE INVENTION

Field of the Invention

The present invention relates to a fuel cell system that is provided in a moving body and generates electric power during operation of the moving body.

Description of the Related Art

In a fuel cell system mounted on a moving body such as a fuel cell vehicle, when the temperature of the surrounding environment becomes low and the inside of the system is frozen during operation stop (power generation stop), power generation immediately after operation start is delayed. For this reason, as shown in JP 2017-147022 A, the present applicant has proposed a technology for performing freezing suppression control in a case where freezing is predicted by monitoring the temperature in the system during stop of operation. In the freezing suppression control, the fuel cell system operates an air pump that supplies cathode gas, and opens a stop valve of a cathode path. As a result, the cathode gas flows into the cathode path, and water in the cathode path is discharged to the outside.

SUMMARY OF THE INVENTION

There are cases where the fuel cell system may receive a request to stop power generation of the fuel cell stack even during operation of the moving body. If the cathode gas is caused to flow through the fuel cell stack each time a request to stop power generation is received during operation of the moving body, deterioration of the electrolyte membrane of the power generation cell inside the fuel cell stack progresses. As a result, the durability of the fuel cell stack deteriorates early in the long term.

On the other hand, if the power generation of the fuel cell stack is stopped by closing the stop valve of the cathode path every time a power generation stop request is received, there is a possibility that the stop valve is frozen while being closed when the temperature of the surrounding environment becomes low.

An object of the present invention is to provide a fuel cell system capable of appropriately preventing freezing in the system and suppressing deterioration of an electrolyte membrane even when power generation is stopped during operation of a moving body.

According to an aspect of the present invention, there is provided a fuel cell system provided in a moving body, the fuel cell system including: a fuel cell stack; a cathode supply path configured to supply cathode gas to the fuel cell stack; a cathode discharge path through which cathode off-gas is discharged from the fuel cell stack; a bypass passage connecting the cathode supply path and the cathode discharge path so as to bypass the fuel cell stack; and an air pump configured to supply the cathode gas to the cathode supply path; one or more stop valves provided between a connection point of the bypass passage on the cathode supply path or the cathode discharge path and the fuel cell stack; a bypass valve provided in the bypass passage; and a control device configured to control operations of the air pump, the one or more stop valves, and the bypass valve, wherein the control device is configured to: acquire temperature information related to a temperature of the fuel cell stack, from a temperature detection unit provided in the fuel cell system; determine whether or not the acquired temperature information exceeds a predetermined temperature value when a signal related to stoppage of power generation of the fuel cell stack is received during operation of the moving body; perform a first control of stopping power generation of the fuel cell stack by closing the one or more stop valves and opening the bypass valve if it is determined that the temperature information exceeds the predetermined temperature value; and perform a second control of generating, with the fuel cell stack, electric power smaller than electric power consumed by the air pump, by operating the air pump, if it is determined that the temperature information is equal to or lower than the predetermined temperature value.

The above-described fuel cell system can appropriately prevent freezing in the system and suppress deterioration of the electrolyte membrane even when power generation is stopped during operation of the moving body.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a block diagram of an ECU of the fuel cell system;

FIG. 3A is an explanatory diagram schematically illustrating a flow state of cathode gas in a stop control, and FIG. 3B is a timing chart illustrating an operation of each component in the stop control;

FIG. 4A is an explanatory diagram schematically showing a flow state of the cathode gas in an idle control, and FIG. 4B is a timing chart illustrating an operation of each component in the idle control;

DESCRIPTION OF THE INVENTION

Figure 1:
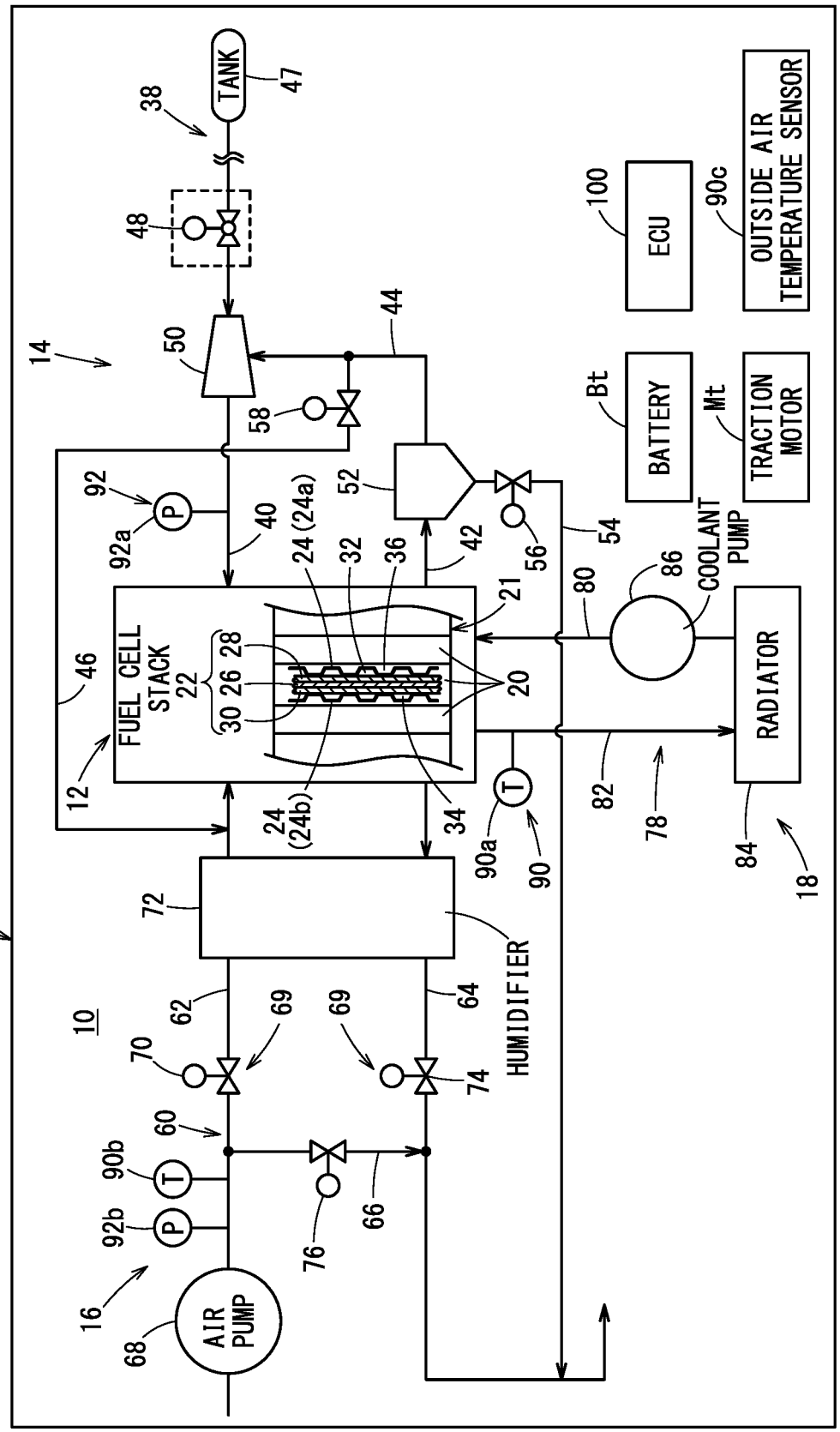
FIG. 1 is an explanatory diagram schematically showing an overall configuration of a fuel cell system according to an embodiment of the present invention.

As shown in FIG. 1, a fuel cell system 10 according to an embodiment of the present invention includes a fuel cell stack 12, an anode system apparatus 14, a cathode system apparatus 16, and a cooling apparatus 18. The fuel cell system 10 is mounted on a moving body 11 such as a fuel cell vehicle. The fuel cell system 10 supplies electric power generated by the fuel cell stack 12 to a battery Bt, a traction motor Mt, and the like. Note that the moving body 11 on which the fuel cell system 10 is mounted is not limited to a fuel cell vehicle, and may be another vehicle, a ship, an aircraft, a robot, or the like.

In the fuel cell stack 12, a stack body 21 in which a plurality of power generation cells 20 are stacked is housed in a stack case (not shown). Each power generation cell 20 generates power by an electrochemical reaction between an anode gas (a fuel gas such as hydrogen) and a cathode gas (an oxygen-containing gas such as air).

Each power generation cell 20 includes a membrane electrode assembly 22 (hereinafter referred to as a "MEA 22") and a pair of separators 24 (24a, 24b) sandwiching the MEA 22. The MEA 22 includes an electrolyte membrane 26, an anode 28 provided on one surface of the electrolyte membrane 26, and a cathode 30 provided on the other surface of the electrolyte membrane 26. The electrolyte membrane 26 is, for example, a solid polymer electrolyte membrane (cation exchange membrane). In the separator 24a, an anode gas flow field 32 through which the anode gas flows is formed on one surface of the MEA 22. The separator 24b forms a cathode gas flow field 34 through which the cathode gas flows on the other surface of the MEA 22. In addition, by stacking the plurality of power generation cells 20, a coolant flow field 36 through which a coolant flows is formed between the surfaces of the separator 24a and the separator 24b facing each other.

Further, each power generation cell 20 includes a plurality of passages (an anode gas passage, a cathode gas passage, and a coolant passage) (not shown) through which the anode gas, the cathode gas, and the coolant flow along the stacking direction of the stack body 21. The anode gas passage communicates with the anode gas flow field 32, the cathode gas passage communicates with the cathode gas flow field 34, and the coolant passage communicates with the coolant flow field 36.

The fuel cell stack 12 is supplied with anode gas by the anode system apparatus 14. In the fuel cell stack 12, the anode gas flows through the anode gas passage (anode gas supply passage) into the anode gas flow field 32. The anode gas is used for power generation in the anode 28. Anode off-gas used for power generation flows out from the anode gas flow field 32 to the anode gas passage (anode gas discharge passage) and is discharged from the fuel cell stack 12 to the anode system apparatus 14. The anode off-gas contains unreacted hydrogen.

Cathode gas is supplied to the fuel cell stack 12 by the cathode system apparatus 16. In the fuel cell stack 12, the cathode gas flows through the cathode gas passage (cathode gas supply passage) into the cathode gas flow field 34. The cathode gas is used for power generation in the cathode 30. The cathode off-gas used for power generation flows out from the cathode gas flow field 34 to the cathode gas passage (cathode gas discharge passage) and is discharged from the fuel cell stack 12 to the cathode system apparatus 16.

Further, the fuel cell stack 12 is supplied with a coolant by the cooling apparatus 18. In the fuel cell stack 12, coolant flows through the coolant passage (coolant supply passage) into the coolant flow field 36. The coolant cools the power generation cell 20. The coolant that has cooled the power generation cells 20 flows out from the coolant flow field 36 to the coolant passage (coolant discharge passage) and is discharged from the fuel cell stack 12 to the cooling apparatus 18.

The anode system apparatus 14 of the fuel cell system 10 has an anode path 38. The anode path 38 includes an anode supply path 40 that supplies anode gas to the fuel cell stack 12 and an anode discharge path 42 that discharges anode off-gas from the fuel cell stack 12. The anode path 38 has an anode circulation path 44 for returning unreacted hydrogen contained in the anode off-gas of the anode discharge path 42 to the anode supply path 40. The anode circulation path 44 is connected to a bleed path 46 through which part of the anode off-gas flows from the circulation circuit of the anode system apparatus 14 to the cathode system apparatus 16.

A tank 47 that stores anode gas is provided upstream of the anode supply path 40. Further, in the anode supply path 40, an injector 48 and an ejector 50 are provided in this order toward the downstream side in the flow direction of the anode gas. The injector 48 is opened and closed during the operation of the fuel cell system 10 to discharge the anode gas whose pressure has been reduced to less than the pressure on the tank 47 side, downstream. The ejector 50 supplies the anode gas discharged from the injector 48 to the fuel cell stack 12. The ejector 50 suctions the anode off-gas from the anode circulation path 44 and supplies the suctioned anode off-gas to the fuel cell stack 12. The ejector 50 suctions the anode off-gas by a negative pressure generated by the flow of the anode gas discharged from the injector 48.

A gas-liquid separator 52 is provided in the anode discharge path 42. The gas-liquid separator 52 separates liquid water (water generated during power generation) contained in the anode off-gas from the anode off-gas. The anode circulation path 44 is connected to an upper portion of the gas-liquid separator 52. Thus, the anode off-gas (gas), from the gas-liquid separator 52, that does not contain water flows to the anode circulation path 44. One end of a drain path 54 for discharging separated water is connected to a bottom portion of the gas-liquid separator 52. A drain valve 56 for opening and closing the flow path is provided in the drain path 54. The bleed path 46 is provided with a bleed valve 58 that opens and closes a flow passage in the bleed path 46.

The cathode system apparatus 16 of the fuel cell system 10 has a cathode path 60. The cathode path 60 includes a cathode supply path 62 that supplies cathode gas to the fuel cell stack 12, and a cathode discharge path 64 that discharges cathode off-gas from the fuel cell stack 12. A cathode bypass passage 66 is connected between the cathode supply path 62 and the cathode discharge path 64. As a result, the cathode gas in the cathode supply path 62 flows directly to the cathode discharge path 64 without passing through the fuel cell stack 12.

An air pump 68 (air compressor) that supplies cathode gas to the fuel cell stack 12 is provided in the cathode supply path 62. During rotation of a fan (not shown), the air pump 68 compresses air (outside air) of the upstream side of the air pump 68 and supplies the compressed air to the cathode supply path 62 on the downstream side. Further, the air pump 68 according to the present embodiment is a shaft-floating type air pump that separates the fan from a peripheral wall surrounding the fan during rotation of the fan.

The cathode supply path 62 includes a supply-side stop valve 70 on the downstream side of the air pump 68 and the cathode bypass passage 66. The cathode supply path 62 includes a humidifier 72 between the supply-side stop valve 70 and the fuel cell stack 12. Although not illustrated, an auxiliary device such as an intercooler for cooling the cathode gas may be provided in the cathode supply path 62. The bleed path 46 is connected to the cathode supply path 62 at the downstream side of the humidifier 72. A gas-liquid separator (not shown) is preferably provided at a connection portion between the cathode supply path 62 and the bleed path 46.

The humidifier 72 is provided so as to straddle the cathode supply path 62 and the cathode discharge path 64. The humidifier 72 humidifies the cathode gas flowing through the cathode supply path 62 with moisture (such as water generated during power generation) contained in the cathode off-gas discharged from the fuel cell stack 12 to the cathode discharge path 64.

The cathode discharge path 64 includes a discharge-side stop valve 74 between the humidifier 72 and the cathode bypass passage 66. Further, the drain path 54 of the anode system apparatus 14 is connected to the cathode discharge path 64 on the downstream side of the cathode bypass passage 66. The cathode bypass passage 66 is provided with a bypass valve 76 for adjusting the flow rate of cathode gas bypassing the fuel cell stack 12.

A stop valve 69 includes a supply-side stop valve 70 and a discharge-side stop valve 74 that open and close the cathode path 60. One or more stop valves 69 are provided. In the present embodiment, a butterfly valve whose opening degree can be linearly adjusted is applied as the stop valve. Similarly, as the bypass valve 76, a butterfly valve whose opening degree can be linearly adjusted is used. Note that the supply-side stop valve 70 and the discharge-side stop valve 74 may be valves that switch between ON (opening degree 100%) and OFF (opening degree 0%), such as solenoid valves. Further, the fuel cell system 10 is not limited to including both the supply-side stop valve 70 and the discharge-side stop valve 74, and may include at least one of these valves.

The cooling apparatus 18 of the fuel cell system 10 has a coolant path 78 through which coolant flows. The coolant path 78 includes a coolant supply path 80 for supplying coolant to the fuel cell stack 12 and a coolant discharge path 82 for discharging coolant from the fuel cell stack 12. The coolant supply path 80 and the coolant discharge path 82 are connected to a radiator 84 that cools the coolant. A coolant pump 86 is provided in the coolant supply path 80. The coolant pump 86 circulates the coolant through the coolant circulation circuit (between the fuel cell stack 12, the coolant supply path 80, the coolant discharge path 82, and the radiator 84).

Further, the fuel cell system 10 includes a plurality of temperature detection units 90 for detecting the temperature of the fuel cell system 10. The temperature detection units 90 include a coolant outlet temperature sensor 90a provided upstream of the coolant discharge path 82 (on the fuel cell stack 12 side), a cathode temperature sensor 90b provided in the cathode supply path 62, and the like. The coolant outlet temperature sensor 90a are provided near the coolant discharge port of the fuel cell stack 12 to approximately detect the temperature of the fuel cell stack 12. The cathode temperature sensor 90b is provided on the upstream side of the cathode bypass passage 66 (and on the downstream side of the intercooler) to approximately detect the ambient temperature of the cathode system apparatus 16. The ambient temperature of the cathode system apparatus 16 also correlates with the temperature of the fuel cell stack 12. In this sense, the detection of the ambient temperature of the cathode system apparatus 16 also detects temperature information related to the temperature of the fuel cell stack 12.

Further, the fuel cell system 10 includes a plurality of pressure detection units 92 in order to obtain a differential pressure (pressure difference) between electrodes of the fuel cell stack 12. The pressure detection unit 92 includes an anode pressure sensor 92a that detects the pressure in the anode supply path 40 downstream of the ejector 50, and a cathode pressure sensor 92b that detects the pressure in the cathode supply path 62 downstream of the air pump 68. The anode pressure sensor 92a detects the pressure in the circulation circuit of the anode path 38 to approximately detect the pressure at the anode 28 in the fuel cell stack 12. The cathode pressure sensor 92b detects the pressure in the cathode supply path 62 to approximately detect the pressure at the cathode 30 in the fuel cell stack 12.

The above-described fuel cell system 10 includes an ECU 100 (Electronic Control Unit: a control device) that controls operation of each component of the fuel cell system 10. The ECU 100 is constituted by a computer having one or more processors, memories, input/output interfaces, and electronic circuits. The ECU 100 controls operations of the air pump 68, the stop valves 69, the bypass valve 76, and the like by one or more processors executing programs (not shown) stored in a memory. In addition, the ECU 100 according to the present embodiment performs a process of stopping power generation of the fuel cell stack 12 (hereinafter referred to as a power generation stop process) during operation of the moving body 11. Note that the operation of the moving body 11 includes situations such as moving and stopping of the moving body 11.

In order to perform the power generation stop process, as shown in FIG. 2, the ECU 100 contains therein a power generation request acquisition unit 102, a temperature acquisition unit 104, a pressure acquisition unit 106, a valve state acquisition unit 108, a stop operation determination unit 110, and an operation control unit 112.

The power generation request acquisition unit 102 receives a power generation request signal transmitted from another ECU during operation of the moving body 11. Examples of the other ECUs include a travel control ECU that controls the traction motor Mt and a battery ECU that monitors the remaining battery level of the battery Bt. Note that the ECU 100 itself may have the functions of the travel control ECU and the battery ECU, and may calculate the power generation request based on signals from sensors (an accelerator opening sensor, a vehicle speed sensor, and the like). Upon receiving a signal (power generation stop signal) indicating that the power generation request is zero during operation, the power generation request acquisition unit 102 gives the stop operation determination unit 110 and the operation control unit 112 a command for performing a power generation stop process.

The temperature acquisition unit 104 acquires the temperature detected by the temperature detection unit 90 at an appropriate timing (for example, every predetermined period) during the operation of the moving body 11 and stores the acquired temperature in the memory. The pressure acquisition unit 106 acquires the detected pressure of the pressure detection unit 92 at an appropriate timing (for example, every predetermined period) during the operation of the moving body 11 and stores the detected pressure in the memory.

The valve state acquisition unit 108 acquires state information (normal or abnormal) of the supply-side stop valve 70, the discharge-side stop valve 74, and the like from the abnormality detection unit 114. The abnormality detection unit 114 monitors whether each component of the fuel cell system 10 is normal or abnormal, by an appropriate detection determination method. When there is an abnormality, the abnormality detection unit 114 stores an abnormality code in a memory (status register). For example, the abnormality detection unit 114 detects an abnormality such as a closing abnormality in which the supply-side stop valve 70, the discharge-side stop valve 74, and the bypass valve 76 are not switched from open to closed, or an opening abnormality in which the supply-side stop valve 70, the discharge-side stop valve 74, and the bypass valve 76 are not switched from closed to open, and stores an abnormality code corresponding to the abnormality content.

Upon receiving an instruction to stop power generation (power generation request is zero) from the power generation request acquisition unit 102, the stop operation determination unit 110 determines the processing content of the power generation stop process, based on the temperature information of the temperature acquisition unit 104. Here, in the power generation stop process, the fuel cell system 10 according to the present embodiment performs stop control for stopping power generation of the fuel cell stack 12 as first control, and idle control for slightly performing power generation of the fuel cell stack 12 as second control. Therefore, the operation control unit 112 includes therein a stop control processing unit 116 that performs the stop control and an idle control processing unit 118 that performs the idle control.

As shown in FIGS. 3A and 3B, the stop control processing unit 116 stops the supply of cathode gas to the fuel cell stack 12 in the stop control. As a result, the power generation amount of the fuel cell stack 12 becomes 0. Specifically, in the cathode system apparatus 16, the stop control processing unit 116 closes both or at least one of the supply-side stop valve 70 and the discharge-side stop valve 74 while opening the bypass valve 76. At this time, the ECU 100 fully closes the flow path of the cathode supply path 62 (i.e., opening degree 0%) in the supply-side stop valve 70, and fully closes the flow path of the cathode discharge path 64 (i.e., opening degree 0%) in the discharge-side stop valve 74. On the other hand, the ECU 100 fully opens the flow path of the cathode bypass passage 66 in the bypass valve 76 (i.e., opening degree 100%). Accordingly, the cathode gas supplied to the downstream side of the air pump 68 does not flow toward the fuel cell stack 12, but flows from the cathode supply path 62 to the cathode discharge path 64 through the cathode bypass passage 66.

Further, the ECU 100 closes both the supply-side stop valve 70 and the discharge-side stop valve 74. At the same time, by continuing the flow of the anode gas from anode system apparatus 14, the residual oxygen (residual cathode gas) inside the fuel cell stack 12 and in the pipes is consumed. That is, in the fuel cell stack 12, the anode gas and the cathode gas react with each other, whereby residual oxygen in the cathode gas is consumed. By continuing the supply of the anode gas, it is possible to avoid insufficient supply of the anode gas to the fuel cell stack 12 when the power generation returns to normal power generation after the stop control has been performed.

In addition, the ECU 100 operates the air pump 68 by supplying electric power lower than electric power during normal traveling (normal power generation), from the battery Bt to the air pump 68. As a result, the fan of the air pump 68 rotates at a constant rotational speed, and air corresponding to the rotational speed is supplied to the cathode supply path 62. In the stop control, the ECU 100 may adjust the electric power supplied from the battery Bt to the air pump 68, based on a waste electric power request value acquired from the battery ECU or the like.

Note that, in the fuel cell system 10 to which the non-shaft-floating type air pump 68 is applied, the ECU 100 may stop the rotation of the air pump 68 during execution of the stop control (see the two dot-chain line of the air pump 68 in FIG. 3B). This reduces the power consumption of the battery Bt by the air pump 68.

By the stop control described above, in the fuel cell system 10, electric current or electric power output from the fuel cell stack 12 to the traction motor Mt and the battery Bt becomes 0. The fuel cell system 10 supplies electric power of the battery Bt to various electrical devices. By performing such stop control, for example, even when regenerative power is generated in a state where the SOC of the battery Bt is high, the regenerative power can be appropriately discharged. Further, in the fuel cell stack 12, membrane deterioration of the electrolyte membrane 26 due to permeation of the cathode gas in the cathode gas flow field 34 through the membrane electrode assembly 22 is reduced.

As shown in FIGS. 4A and 4B, in the idle control, the idle control processing unit 118 reduces the supply amount of the cathode gas in the power generation stop process to the fuel cell stack 12 to be smaller than the supply amount of the cathode gas during the normal traveling. As a result, the power generation amount of the fuel cell stack 12 decreases. Specifically, the idle control processing unit 118 opens both the supply-side stop valve 70 and the discharge-side stop valve 74, and also opens the bypass valve 76. Thus, the cathode gas flowing out to the downstream side of the air pump 68 is divided into a first flow flowing from the cathode supply path 62 toward the fuel cell stack 12 and a second flow flowing through the cathode bypass passage 66 toward the cathode discharge path 64.

Therefore, in the fuel cell system 10, the fuel cell stack 12 generates electric power while suppressing the generated electric power, and the generated electric power is supplied to each electrical device including the air pump 68. In addition, the fuel cell system 10 supplies electric power of the battery Bt to each electrical device including the air pump 68 as necessary.

For example, in the idle control, the ECU 100 supplies the air pump 68 with power greater than or equal to the power generated by the fuel cell stack 12. That is, when the generated power of the fuel cell stack 12 is defined as A (W), the power consumption of the air pump 68 is A+B (W) (B is a positive number and smaller than A). As a result, electric power generated by the fuel cell stack 12 is consumed (wasted) by the air pump 68.

The air pump 68 supplies the cathode gas to the cathode supply path 62 by rotating the fan at a rotational speed corresponding to the electric power. Further, the ECU 100 adjusts opening and closing (opening degree) of the bypass valve 76 in accordance with a change in the generated power (or current) output from the fuel cell stack 12. For example, the ECU 100 decreases the opening degree of the bypass valve 76 if the current value output from the fuel cell stack 12 increases. On the other hand, the ECU 100 performs control to increase the opening degree of the bypass valve 76 if the current value output from the fuel cell stack 12 decreases.

Further, in the idle control, the ECU 100 fully opens both the supply-side stop valve 70 and the discharge-side stop valve 74 (i.e., opening degree 100%). Thus, the cathode gas smoothly flows to the fuel cell stack 12. The ECU 100 may adjust the opening degree of the stop valve 69 (the supply-side stop valve 70 and the discharge-side stop valve 74) in accordance with the adjustment of the opening degree of the bypass valve 76. By adjusting the opening degree of the stop valve 69, the generated electric power of the fuel cell stack 12 can be adjusted more accurately.

By performing the idle control described above, a large potential fluctuation of the power generated by the fuel cell stack 12 is suppressed. Therefore, deterioration of the pair of separators 24, the anode 28, and the cathode 30 caused by potential fluctuation is suppressed.

Returning to FIG. 2, when all of the following conditions (a) to (c) are satisfied, the stop operation determination unit 110 determines to perform the stop control. Therefore, the stop operation determination unit 110 determines to perform the idle control if even one of the conditions (a) to (c) is not satisfied.

(a) The temperature of the fuel cell stack 12 and/or the ambient temperature of the cathode system apparatus 16 exceeds a predetermined temperature value (determination temperature threshold Tt).

(b) Both the supply-side stop valve 70 and the discharge-side stop valve 74 are not in the closing abnormality.

(c) The electrode differential pressure between the pressure at the anode 28 and the pressure at the cathode 30 is equal to or less than a predetermined pressure value (determination differential pressure threshold Tp).

The condition (a) is a condition for determining the possibility of freezing of one or more stop valves 69, the cathode path 60, or the like due to water generated during power generation of the fuel cell stack 12 in the fuel cell system 10. If any one of the one or more stop valves 69 is frozen in a closed state during the stop control, the start of power generation of the fuel cell stack 12 is delayed or power generation cannot be performed.

The stop operation determination unit 110 has in advance the determination temperature threshold Tt for determining the possibility of freezing. There is often a large difference between the temperature of the fuel cell stack 12 and the outside air temperature during traveling of the moving body 11. Therefore, the determination temperature threshold Tt is preferably set in consideration of an elapsed time after the start-up, a measurement error, and the like.

As the temperature information of the fuel cell stack 12 to be compared with the determination temperature threshold Tt, the temperature detected by the coolant outlet temperature sensor 90a provided in the coolant discharge path 82 is used. Further, the fuel cell system 10 may use, as the temperature information of the fuel cell stack 12, a temperature detected by a cathode temperature sensor 90b provided in the cathode supply path 62. In the present embodiment, the stop operation determination unit 110 performs the determination using, as the temperature information, both the temperature detected by the coolant outlet temperature sensor 90a and the temperature detected by the cathode temperature sensor 90b. The temperature around the cathode system apparatus 16 (i.e., the temperature at the cathode temperature sensor 90b) correlates with the temperature of the fuel cell stack 12. Therefore, the stop operation determination unit 110 does not necessarily need to use the ambient temperature of the cathode system apparatus 16 as the temperature information for the determination.

Alternatively, the stop operation determination unit 110 may use, as the temperature information, a temperature detected by an outside air temperature sensor 90c (see FIG. 1) that detects the outside air temperature. For example, the stop operation determination unit 110 may estimate the possibility of freezing of the stop valve 69 (the supply-side stop valve 70 and the discharge-side stop valve 74) using the temperature detected by the coolant outlet temperature sensor 90a or the cathode temperature sensor 90b and the temperature detected by the outside air temperature sensor 90c.

Immediately after the start of operation of the moving body 11 or the like, there is a large difference between the temperature of the fuel cell stack 12 and the ambient temperature of the cathode system apparatus 16. Therefore, the determination temperature threshold Tt may include two different values, i.e., a value for determining the temperature of the fuel cell stack 12 and another value for monitoring the ambient temperature of the cathode system apparatus 16. For example, when starting up in a cryogenic environment, there is a possibility that a large difference occurs between the temperature of the fuel cell stack 12 and the ambient temperature of the cathode system apparatus 16. Therefore, at the start-up under the cryogenic environment, the determination temperature threshold Tt for determining the temperature of the fuel cell stack 12 and the determination temperature threshold Tt for determining the ambient temperature of the cathode system apparatus 16 may be each set to a value at which it can be ensured that the corresponding component is in a thawed state.

When the temperature of the fuel cell stack 12 exceeds the determination temperature threshold Tt, the stop operation determination unit 110 determines that the condition (a) is satisfied. Conversely, when the temperature of the fuel cell stack 12 is equal to or lower than the determination temperature threshold Tt, the stop operation determination unit 110 determines that the above condition (a) is not satisfied.

When any of the one or more stop valves 69 is suffering from the closing abnormality, an inconvenience occurs in the execution of the stop control. The condition (b) excludes the closing abnormality of each valve. The stop operation determination unit 110 monitors the states of the valves (the supply-side stop valve 70 and the discharge-side stop valve 74) acquired by the valve state acquisition unit 108. Then, the stop operation determination unit 110 determines that the condition (b) is satisfied when all of the valves are normal, and determines that the condition (b) is not satisfied when there is a closing abnormality in any of the valves.

If the stop valve 69 is closed when the electrode differential pressure between the anode 28 and the cathode 30 in the fuel cell stack 12 is large, there is a possibility that the fuel cell stack 12 may be damaged. The condition (c) excludes a state where the electrode differential pressure is large. The stop operation determination unit 110 calculates the absolute value of the electrode differential pressure, based on the pressure of the anode pressure sensor 92a and the pressure of the cathode pressure sensor 92b acquired by the pressure acquisition unit 106. Then, the stop operation determination unit 110 determines that the condition (c) is satisfied when the calculated electrode differential pressure is equal to or less than the determination differential pressure threshold Tp, and determines that the condition (c) is not satisfied when the calculated electrode differential pressure exceeds the determination differential pressure threshold Tp.

In addition, the stop operation determination unit 110 continuously monitors the above-described conditions (a) to (c) even while the stop control is being performed. For example, even when the stop control is performed, if the temperature of the fuel cell stack 12 becomes equal to or lower than the determination temperature threshold Tt, the stop operation determination unit 110 shifts from the stop control to the idle control. Alternatively, even when the idle control is performed based on the condition (a) not being satisfied, if the temperature of the fuel cell stack 12 exceeds the determination temperature threshold Tt, the stop operation determination unit 110 shifts from the idle control to the stop control. Further, for example, in a case where the idle control is performed based on the condition (c) not being satisfied while the conditions (a) and (b) are satisfied, the stop operation determination unit 110 may shift from the idle control to the stop control if the subsequent electrode differential pressure becomes equal to or less than the determination differential pressure threshold Tp.

The stop operation determination unit 110 may determine at least whether the temperature of the fuel cell stack 12 exceeds the determination temperature threshold Tt (whether the condition of (a) is satisfied or not) without determining all of the conditions of (a) to (c). When there is no possibility of freezing of the fuel cell system 10, the stop control is performed to give priority to suppression of deterioration of the electrolyte membrane 26, so that the durability of the fuel cell stack 12 can be significantly increased.

The fuel cell system 10 according to the present embodiment is basically configured as described above. The operation will be described below.

During driving (during operation based on turning on an ignition or a starter switch), the moving body 11 travels based on a driving operation of a user or automatic driving of a control device of the moving body 11. Even if the temperature of the surrounding environment is low at the time of start-up, the fuel cell stack 12, the anode system apparatus 14, and the cathode system apparatus 16 are not frozen by being warmed up at the time of start-up. Therefore, if the fuel cell stack 12 does not stop power generation while the moving body 11 is traveling, the one or more stop valves 69 and the bypass valve 76 are opened and closed to allow the cathode gas to flow therethrough.

The fuel cell system 10 operates the anode system apparatus 14 and the cathode system apparatus 16 during normal traveling of the moving body 11. The anode system apparatus 14 supplies an anode gas to the fuel cell stack 12. The cathode system apparatus 16 supplies a cathode gas to the fuel cell stack 12. As a result, the fuel cell stack 12 generates electric power, and the generated power is supplied to the traction motor Mt, the battery Bt, and the like.

Figure 5:
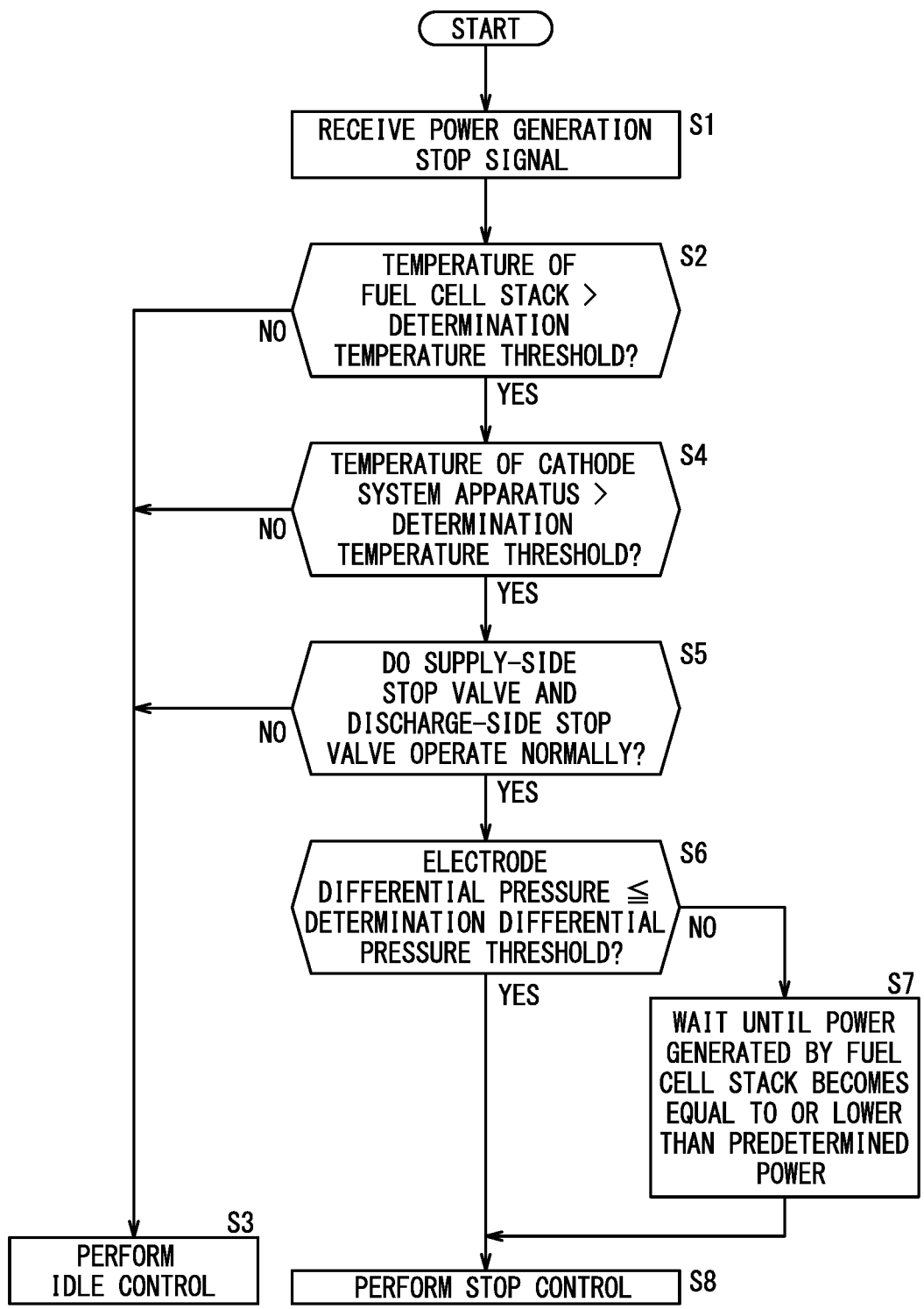
FIG. 5 is a flowchart illustrating a process of the ECU when a power generation stop signal is received during operation of the moving body.

When receiving a power generation request from the travel control ECU or the battery ECU (not shown) during operation (during travel or during travel stop), the ECU 100 starts the power generation stop process according to the process flow shown in FIG. 5.

Specifically, the ECU 100 receives a power generation stop signal through the power generation request acquisition unit 102 during operation (step S1). Upon receiving the instruction to stop power generation, from the power generation request acquisition unit 102, the stop operation determination unit 110 determines whether or not the temperature of the fuel cell stack 12 (coolant outlet temperature sensor 90a) acquired by the temperature acquisition unit 104 at that time exceeds the determination temperature threshold Tt (step S2).

When the temperature of the fuel cell stack 12 is equal to or lower than the determination temperature threshold Tt (step S2: NO), the process proceeds to step S3, and the stop operation determination unit 110 determines execution of the idle control. In the idle control, the operation control unit 112 opens the supply side stop valve 70, the discharge-side stop valve 74, and the bypass valve 76, of the cathode system apparatus 16. In addition, the operation control unit 112 consumes power generated by the fuel cell stack 12, by supplying power larger than the power generated by the fuel cell stack 12, from the fuel cell stack 12 and the battery Bt to the air pump 68. Part of the cathode gas supplied from the air pump 68 to the cathode supply path 62 is discharged to the cathode discharge path 64 via the cathode bypass passage 66. Thus, the flow rate of the cathode gas flowing toward the fuel cell stack 12 is adjusted to an amount corresponding to the electric power generated by the fuel cell stack 12.

On the other hand, when the temperature of the fuel cell stack 12 exceeds the determination temperature threshold Tt (step S2: YES), the stop operation determination unit 110 proceeds to step S4. In step S4, the stop operation determination unit 110 determines whether or not the ambient temperature of the cathode system apparatus 16 (the temperature of the cathode temperature sensor 90b) acquired by the temperature acquisition unit 104 at the time of the instruction to stop power generation exceeds the determination temperature threshold Tt. When the ambient temperature of the cathode system apparatus 16 is equal to or lower than the determination temperature threshold Tt (step S4: NO), the stop operation determination unit 110 proceeds to step S3. On the other hand, when the ambient temperature of the cathode system apparatus 16 exceeds the determination temperature threshold Tt (step S4: YES), the stop operation determination unit 110 proceeds to step S5.

In step S5, the stop operation determination unit 110 determines whether each of states of the supply-side stop valve 70 and the discharge-side stop valve 74 acquired via the valve state acquisition unit 108 is normal or abnormal. When any one of the supply-side stop valve 70 and the discharge-side stop valve 74 has a closing abnormality (step S5: NO), the stop operation determination unit 110 proceeds to step S3. On the other hand, when both the supply-side stop valve 70 and the discharge-side stop valve 74 are normal (step S5: YES), the stop operation determination unit 110 proceeds to step S6.

In step S6, the stop operation determination unit 110 calculates the electrode differential pressure, based on the pressures of the anode pressure sensor 92a and the cathode pressure sensor 92b acquired via the pressure acquisition unit 106. The stop operation determination unit 110 determines whether or not the electrode differential pressure is equal to or less than a determination differential pressure threshold Tp (i.e., whether the electrode differential pressure the threshold). When the electrode differential pressure exceeds the determination differential pressure threshold Tp (step S6: NO), the stop operation determination unit 110 proceeds to step S7.

In step S7, the stop operation determination unit 110 waits until the power generated by the fuel cell stack 12 becomes equal to or lower than a predetermined power. When the standby in step S7 ends, the stop operation determination unit 110 proceeds to step S8. The processing of step S7 is not limited to the above, and may wait until the electrode differential pressure becomes equal to or less than the determination differential pressure threshold Tp. Alternatively, the stop operation determination unit 110 may perform step S3 when the differential pressure exceeds the determination differential pressure threshold Tp without performing step S7.

On the other hand, when the electrode differential pressure is equal to or less than the determination differential pressure threshold Tp in step S6 (step S6: YES) or after step S7 has been performed, the stop operation determination unit 110 determines to perform the stop control (step S8). In the stop control, the operation control unit 112 fully closes the supply-side stop valve 70 and the discharge-side stop valve 74 of the cathode system apparatus 16, and fully opens the bypass valve 76. Further, the operation control unit 112 drives the air pump 68 to supply the cathode gas from the air pump 68 to the cathode supply path 62. Since the supply-side stop valve 70 and the discharge-side stop valve 74 are fully closed, the cathode gas is discharged to the cathode discharge path 64 via the cathode bypass passage 66. As a result, the cathode gas does not flow into the fuel cell stack 12, so that the fuel cell stack 12 stops power generation after consuming the remaining cathode gas.

Figure 6:
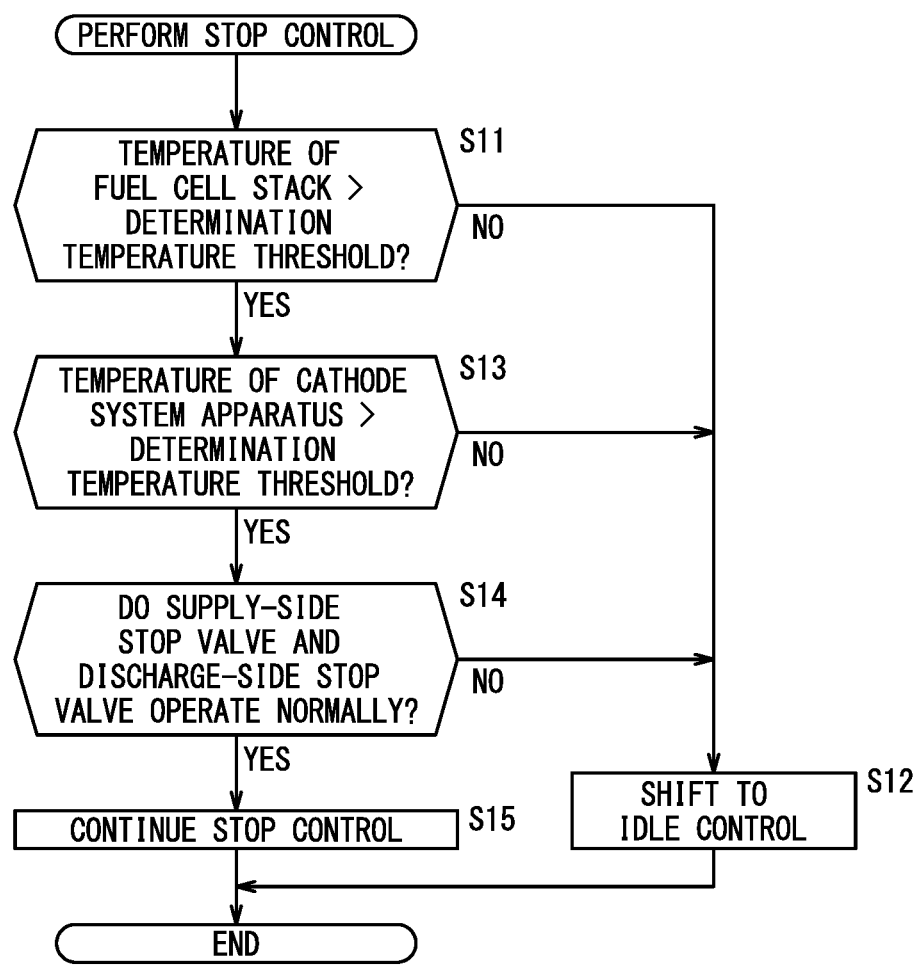
FIG. 6 is a flowchart illustrating processing of the ECU during a stop control.

Further, the ECU 100 performs the processing flow illustrated in FIG. 6 during the execution of the stop control. That is, the stop operation determination unit 110 determines whether or not the temperature of the fuel cell stack 12 (coolant outlet temperature sensor 90a) after the start of the stop control exceeds the determination temperature threshold Tt (step S11). When the temperature of the fuel cell stack 12 becomes equal to or lower than the determination temperature threshold Tt (step S11: NO), the stop operation determination unit 110 proceeds to step S12 and switches from the stop control to the idle control. On the other hand, when the temperature of the fuel cell stack 12 exceeds the determination temperature threshold Tt (step S11: YES), the stop operation determination unit 110 proceeds to step S13.

In step S13, the stop operation determination unit 110 determines whether or not the ambient temperature of the cathode system apparatus 16 after the start of the stop control (the temperature of the cathode temperature sensor 90b) exceeds the determination temperature threshold Tt. When the ambient temperature of the cathode system apparatus 16 is equal to or lower than the determination temperature threshold Tt (step S13: NO), the stop operation determination unit 110 proceeds to step S12. On the other hand, when the ambient temperature of the cathode system apparatus 16 exceeds the determination temperature threshold Tt (step S13: YES), the stop operation determination unit 110 proceeds to step S14.

In step S14, the stop operation determination unit 110 determines whether each of states of the supply-side stop valve 70 and the discharge-side stop valve 74 after the start of the stop control is normal or abnormal. When any one of the supply-side stop valve 70 and the discharge-side stop valve 74 has a closing abnormality (step S14: NO), the stop operation determination unit 110 proceeds to step S12. On the other hand, when all of the supply-side stop valve 70 and the discharge-side stop valve 74 are normal (step S14: YES), the stop operation determination unit 110 proceeds to step S15.

In step S15, the stop operation determination unit 110 determines continuation of the stop control. As described above, in the stop control, the ECU 100 can shift from the stop control to the idle control by repeating the processing flow of steps S11 to S15 while performing the stop control by the operation control unit 112. In the fuel cell system 10, when the stop control is continued, there is a possibility that one or more stop valves 69 are frozen due to the influence of the outside air temperature or the like. However, the fuel cell system 10 can avoid freezing, by shifting from the stop control to the idle control.

Figure 7:
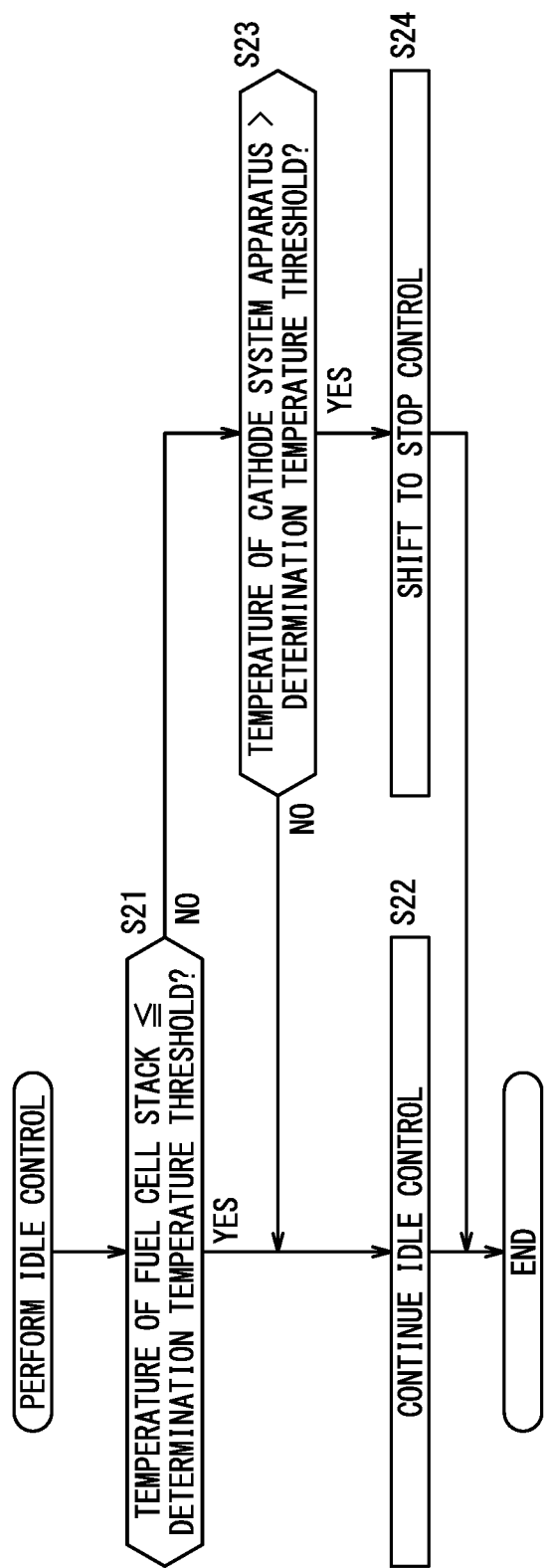
FIG. 7 is a flowchart illustrating processing of the ECU in the idle control.

The ECU 100 performs the processing flow shown in FIG. 7 during execution of the idle control. That is, the stop operation determination unit 110 determines whether or not the temperature of the fuel cell stack 12 (coolant outlet temperature sensor 90a) after the start of the idle control is equal to or lower than the determination temperature threshold Tt (i.e., whether the temperature of the fuel cell stack- ≤the threshold) (step S21). When the temperature of the fuel cell stack 12 is maintained at or below the determination temperature threshold Tt (step S21: YES), the stop operation determination unit 110 proceeds to step S22 and continues the idle control. On the other hand, when the temperature of the fuel cell stack 12 exceeds the determination temperature threshold Tt (step S21: NO), the stop operation determination unit 110 proceeds to step S23.

In step S23, the stop operation determination unit 110 determines whether or not the ambient temperature of the cathode system apparatus 16 after the start of the idle control (the temperature of the cathode temperature sensor 90b) exceeds the determination temperature threshold Tt. When the ambient temperature of the cathode system apparatus 16 is equal to or lower than the determination temperature threshold Tt (step S23: NO), the stop operation determination unit 110 proceeds to step S22. On the other hand, when the ambient temperature of the cathode system apparatus 16 exceeds the determination temperature threshold Tt (step S23: YES), the stop operation determination unit 110 proceeds to step S24.

In step S24, the stop operation determination unit 110 switches from the idle control to the stop control. In this manner, the ECU 100 can shift from the idle control to the stop control by repeating the processing flow of steps S21 to S24 while performing the idle control by the operation control unit 112.

When the idle control is performed based on occurrence of the closing abnormality of the stop valve 69 acquired from the abnormality detection unit 114, the ECU 100 prohibits the stop control from being performed and continues the idle control. That is, the processing flow of steps S21 to S24 is not performed. As a result, the ECU 100 can prevent inadvertent switching to the stop control when the idle control based on occurrence of the closing abnormality of the stop valve 69 is being performed.

The present invention is not limited to the above-described embodiment, and various modifications can be made along the gist of the invention. For example, the cathode discharge path 64 may be provided with a back pressure valve (not shown) in addition to the discharge-side stop valve 74. In this case, the back pressure valve may perform the same opening/closing operation as the discharge-side stop valve 74 during the stop control and the idle control.

Further, during execution of the stop control and/or during execution of the idle control, the determination temperature threshold Tt may be set to a value different from the determination temperature threshold Tt used at the start of the power generation stop process. Hereinafter, a processing flow in the stop control and the idle control of the fuel cell system 10 according to modifications will be exemplified with reference to FIGS. 8A and 8B.

Figure 8A:
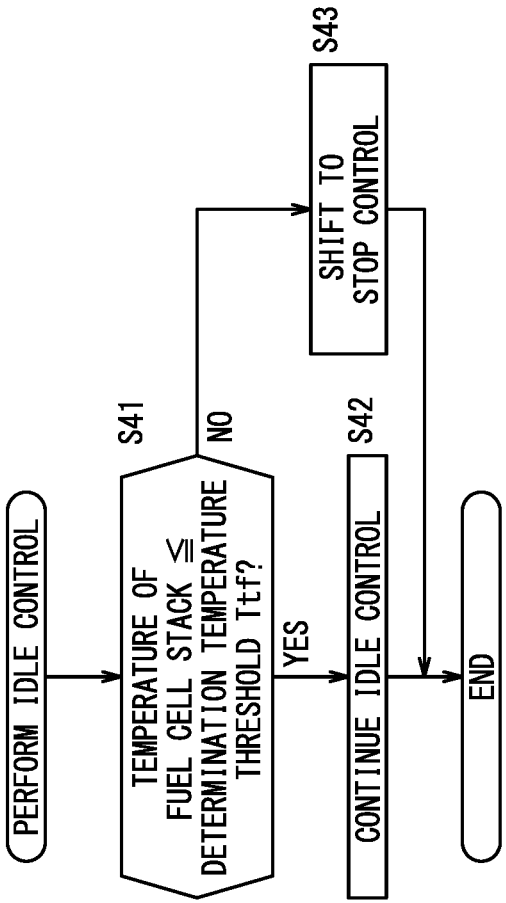
FIG. 8A is a flowchart illustrating processing of the ECU during stop control according to a modification.

As shown in FIG. 8A, in the stop control, the stop operation determination unit 110 determines whether or not the temperature of the fuel cell stack 12 (coolant outlet temperature sensor 90a) after the start of the stop control exceeds a value obtained by adding a first margin tx to the determination temperature threshold Tt (step S31). The first margin tx is determined by obtaining in advance a change in the temperature of the fuel cell stack 12 with respect to the temperature of the surrounding environment when the stop control is performed, by an experiment or the like. When the temperature of the fuel cell stack 12 becomes equal to or lower than Tt+tx (step S31: NO), the stop operation determination unit 110 proceeds to step S32 and switches from the stop control to the idle control. On the other hand, when the temperature of the fuel cell stack 12 exceeds Tt+tx (step S31: YES), the process proceeds to step S33.

In step S33, the stop operation determination unit 110 determines whether or not the ambient temperature of the cathode system apparatus 16 after the start of the stop control (the temperature of the cathode temperature sensor 90b) exceeds a value obtained by adding a second margin ty to the determination temperature threshold Tt. The second margin ty is determined by obtaining in advance a change in the ambient temperature of the cathode system apparatus 16 with respect to the temperature of the surrounding environment when the stop control is performed, by an experiment or the like. When the ambient temperature of the cathode system apparatus 16 is equal to or lower than Tt+ty (step S33: NO), the stop operation determination unit 110 proceeds to step S32. When the ambient temperature of the cathode system apparatus 16 exceeds Tt+ty (step S33: YES), the stop operation determination unit 110 proceeds to step S34.

In step S34, the stop operation determination unit 110 determines whether each of states of the supply-side stop valve 70 and the discharge-side stop valve 74 after the start of the stop control is normal or abnormal. When any one of the supply-side stop valve 70 and the discharge-side stop valve 74 has a closing abnormality (step S34: NO), the stop operation determination unit 110 proceeds to step S32. When both the supply-side stop valve 70 and the discharge-side stop valve 74 are normal (step S34: YES), the stop operation determination unit 110 proceeds to step S35. In step S35, the stop operation determination unit 110 determines continuation of the stop control.

Figure 8B:
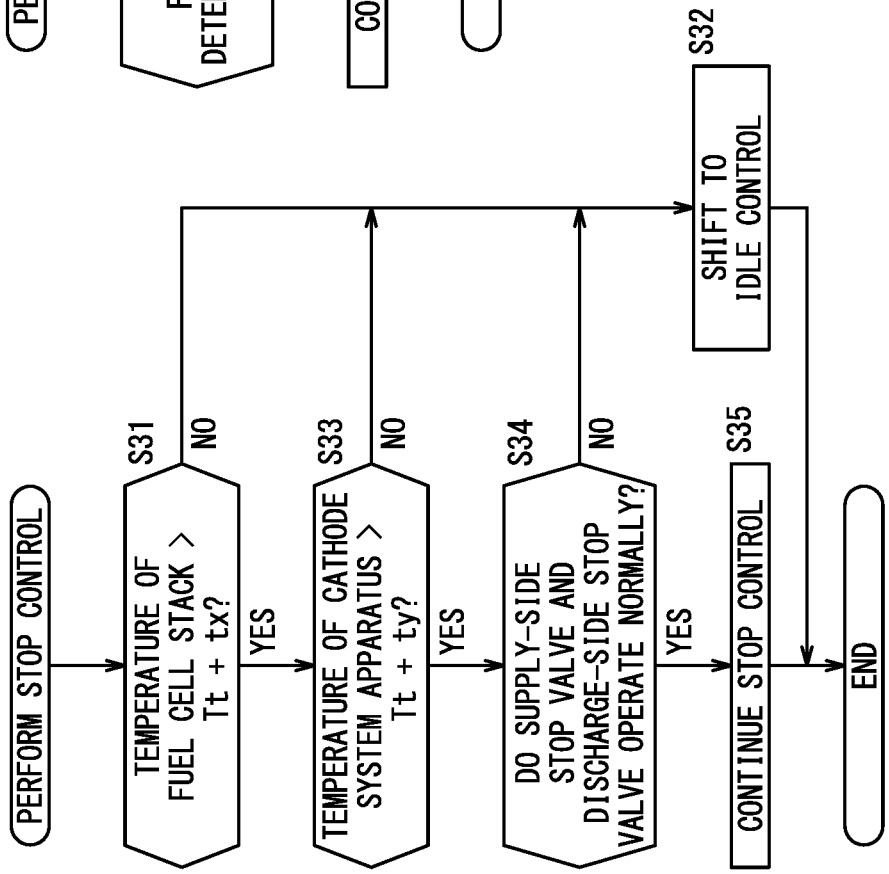
FIG. 8B is a flowchart illustrating processing of the ECU in idle control according to another modification.

In ECU 100, as shown in FIG. 8B, in the idle control, the stop operation determination unit 110 determines whether or not the temperature of the fuel cell stack 12 (coolant outlet temperature sensor 90a) after the start of the idle control is equal to or lower than a determination temperature threshold Ttf that is a fixed value (i.e., whether the temperature of the fuel cell≤the threshold Ttf) (step S41). The determination temperature threshold Ttf is preferably set to an appropriate value in consideration of temperature dependence of chemical deterioration of the fuel cell stack 12.

When the temperature of the fuel cell stack 12 is maintained at or below the determination temperature threshold Ttf (step S41: YES), the stop operation determination unit 110 proceeds to step S42 and continues the idle control. On the other hand, when the temperature of the fuel cell stack 12 exceeds the determination temperature threshold Ttf (step S41: NO), the stop operation determination unit 110 proceeds to step S43, and the operation control unit 112 shifts to the stop control. As described above, by using the determination temperature threshold Ttf that is higher than the determination temperature threshold Tt, the fuel cell system 10 can stably shift from the idle control to the stop control.

The technical concept and effects grasped from the above embodiment will be described below.

According to an aspect of the present invention, there is provided a fuel cell system 10 provided in a moving body 11, the fuel cell system including: a fuel cell stack 12; a cathode supply path 62 configured to supply cathode gas to the fuel cell stack 12; a cathode discharge path 64 through which cathode off-gas is discharged from the fuel cell stack 12; a bypass passage (cathode bypass passage 66) connecting the cathode supply path 62 and the cathode discharge path 64 so as to bypass the fuel cell stack 12; and an air pump 68 configured to supply the cathode gas to the cathode supply path 62; one or more stop valves 69 provided between a connection point of the bypass passage on the cathode supply path 62 or the cathode discharge path 64 and the fuel cell stack 12; a bypass valve 76 provided in the bypass passage; and a control device (ECU 100) configured to control operations of the air pump 68, the one or more stop valves 69, and the bypass valve 76, wherein the control device is configured to: acquire temperature information related to a temperature of the fuel cell stack 12, from a temperature detection unit 90 provided in the fuel cell system 10; determine whether or not the acquired temperature information exceeds a predetermined temperature value (a determination temperature threshold Tt) when a signal related to stoppage of power generation of the fuel cell stack 12 is received during operation of the moving body 11; perform a first control (stop control) of stopping power generation of the fuel cell stack 12 by closing the one or more stop valves 69 and opening the bypass valve 76 if it is determined that the temperature information exceeds the predetermined temperature value; and perform a second control (idle control) of generating, with the fuel cell stack, electric power smaller than electric power consumed by the air pump 68, by operating the air pump 68, if it is determined that the temperature information is equal to or lower than the predetermined temperature value.

With the above configuration, the fuel cell system 10 stops the supply of the cathode gas to the fuel cell stack 12, as the first control (stop control), when the temperature information exceeds the predetermined temperature value (determination temperature threshold Tt) during operation of the moving body 11. As a result, the fuel cell system 10 can stop power generation of the fuel cell stack 12 while suppressing power consumption, and can suppress deterioration of the electrolyte membrane 26 caused by cathode gas. On the other hand, when the temperature of the fuel cell stack 12 is equal to or lower than the predetermined temperature value, there is a possibility that the one or more stop valves 69 are frozen and cannot be closed. Therefore, the fuel cell system 10 performs the second control in which the generated power of the fuel cell stack 12 is consumed by the air pump 68, so that the output of power can be substantially eliminated in the entire system.

In addition, the control device (ECU 100) performs the second control when it is determined that the temperature information is equal to or less than a predetermined temperature value (determination temperature threshold Tt) during traveling of the moving body 11. Accordingly, the fuel cell system 10 can perform the power generation stop process in consideration of the possibility that the one or more stop valves 69 are frozen and cannot move, during traveling of the moving body 11, and the output of electric power can be substantially eliminated in the entire fuel cell system 10.

Further, the control device (ECU 100) opens all of the one or more stop valves 69 in the second control. As a result, the fuel cell system 10 can reliably and stably flow the cathode gas through the fuel cell stack 12 in the second control.

Further, the control device (ECU 100) stops the rotation of the air pump 68 in the first control. Accordingly, the fuel cell system 10 can suppress a decrease in the remaining battery level of the battery Bt during the execution of the first control.

When the temperature information becomes equal to or lower than a predetermined temperature value (determination temperature threshold Tt) during execution of the first control, the control device (ECU 100) stops the first control and switches the control to the second control. Here, in the fuel cell system 10, when the power generation of the fuel cell stack 12 continues to be stopped by the first control, there is a possibility that the one or more stop valves 69 are frozen due to the influence of the ambient temperature. Therefore, the ECU 100 continues to monitor the temperature information even during the first control, and switches from the first control to the second control when the temperature information becomes equal to or lower than the predetermined temperature value. Thus, the one or more stop valves 69 can be heated by heat generated by the fuel cell stack 12. As a result, freezing of the one or more stop valves 69 is avoided.

When the temperature information exceeds the predetermined temperature value (determination temperature threshold Tt) during the execution of the second control, the control device (ECU 100) stops the second control and switches to the first control. In the fuel cell system 10, when the fuel cell stack 12 continues to generate power in the second control, the temperature of the stop valves 69 increases due to the heat of the power generation, and the stop valves 69 are less likely to freeze. Therefore, the ECU 100 can suppress the deterioration of the electrolyte membrane 26 by switching from the second control to the first control when the temperature information exceeds the predetermined temperature value.

The control device (ECU 100) further includes an abnormality detection unit 114 that detects whether the one or more stop valves 69 operate normally or abnormally. The control device prohibits the first control and performs the second control when the control device acquires a closing abnormality in which any of the one or more stop valves 69 cannot be closed, from the abnormality detection unit 114. In the fuel cell system 10, in the case of a closing abnormality of the one or more stop valves 69, the first control cannot be executed. Therefore, by performing the second control, the output of electric power can be substantially eliminated as the entire fuel cell system 10.

The control device (ECU 100) acquires pressure information regarding the pressure at the anode 28 and the pressure at the cathode 30 of the fuel cell stack 12, from the pressure detection unit 92 provided in the fuel cell system 10; determines whether the electrode differential pressure between the pressures at the anode 28 and the cathode 30 exceeds a predetermined pressure value (determination differential pressure threshold Tp); and at least temporarily prohibits the first control when the electrode differential pressure exceeds the predetermined pressure value. In the fuel cell stack 12, if the one or more stop valves 69 are closed when the electrode differential pressure is large, there is a possibility that the pair of separators 24 and the fuel cell stack 12 are damaged. Therefore, the fuel cell system 10 can prevent damage to the pair of separators 24 and the fuel cell stack 12, by temporarily prohibiting the first control.

In a case where the control device (ECU 100) prohibits the first control based on the electrode differential pressure exceeding the predetermined pressure value (determination differential pressure threshold Tp) while determining that the temperature information exceeds the predetermined temperature value, the control device waits until the electric power of the fuel cell stack 12 decreases to the predetermined value or until the electrode differential pressure becomes equal to or lower than the predetermined pressure value, and performs the first control after the waiting. As a result, the fuel cell system 10 can perform the first control after the electrode differential pressure decreases, and can suppress deterioration of the electrolyte membrane 26 while preventing damage to the pair of separators 24 and the fuel cell stack 12.

Further, the control device (ECU 100) fully opens the bypass valve 76 in the first control, and adjusts the opening degree of the bypass valve in accordance with the power generation amount of the fuel cell stack 12 in the second control. Thus, the fuel cell system 10 can smoothly discharge the cathode gas from the cathode supply path 62 in the first control. Further, in the second control, an appropriate amount of cathode gas can be supplied to the fuel cell stack 12.

Further, the control device (ECU 100) continues flowing of the anode gas to the fuel cell stack 12 during the execution of the first control. As a result, when the fuel cell system 10 returns to normal power generation after the first control has been performed, the fuel cell system 10 can avoid insufficient supply of the anode gas to the fuel cell stack 12 (i.e., it can ensure a sufficient stoichiometry).

What is claimed is:

1. A fuel cell system provided in a moving body, the fuel cell system comprising:
   a fuel cell stack;
   a cathode supply path configured to supply cathode gas to the fuel cell stack;
   a cathode discharge path through which cathode off-gas is discharged from the fuel cell stack;
   a bypass passage connecting the cathode supply path and the cathode discharge path so as to bypass the fuel cell stack; and
   an air pump configured to supply the cathode gas to the cathode supply path;
   one or more stop valves provided between a connection point of the bypass passage on the cathode supply path or the cathode discharge path and the fuel cell stack;
   a bypass valve provided in the bypass passage; and
   a control device configured to control operations of the air pump, the one or more stop valves, and the bypass valve,
   wherein the control device is configured to:
   acquire temperature information related to a temperature of the fuel cell stack, from a temperature detection unit provided in the fuel cell system;
   determine whether or not the acquired temperature information exceeds a predetermined temperature value when a signal related to stoppage of power generation of the fuel cell stack is received during operation of the moving body;
   perform a first control of stopping power generation of the fuel cell stack by closing the one or more stop valves and opening the bypass valve, if it is determined that the temperature information exceeds the predetermined temperature value; and
   perform a second control of generating, with the fuel cell stack, electric power smaller than electric power consumed by the air pump, by operating the air pump, if it is determined that the temperature information is equal to or lower than the predetermined temperature value.

2. The fuel cell system according to claim 1, wherein the control device is configured to perform the second control when it is determined that the temperature information is equal to or lower than the predetermined temperature value during traveling of the moving body.

3. The fuel cell system according to claim 1, wherein the control device is configured to open all of the one or more stop valves in the second control.

4. The fuel cell system according to claim 1, wherein the control device is configured to stop rotation of the air pump in the first control.

5. The fuel cell system according to claim 1, wherein the control device is configured to stop the first control and switch to the second control when the temperature information becomes equal to or lower than the predetermined temperature value during execution of the first control.

6. The fuel cell system according to claim 1, wherein
the control device is configured to stop the second control and switch to the first control when the temperature information exceeds the predetermined temperature value during execution of the second control.

7. The fuel cell system according to claim 1, further comprising:
an abnormality detection unit configured to detect whether the one or more stop valves operate normally or abnormally,
wherein the control device is configured to prohibit the first control and perform the second control when the control device acquires a closing abnormality in which any of the one or more stop valves cannot be closed, from the abnormality detection unit.

8. The fuel cell system according to claim 1, wherein
the control device is configured to:
acquire pressure information related to a pressure at an anode and a pressure at a cathode of the fuel cell stack, from a pressure detection unit provided in the fuel cell system;
determine whether or not an electrode differential pressure between the pressure at the anode and the pressure at the cathode exceeds a predetermined pressure value; and
when the electrode differential pressure exceeds the predetermined pressure value, prohibit the first control at least temporarily.

9. The fuel cell system according to claim 8, wherein
the control device is configured to, in a case where the first control is prohibited based on the electrode differential pressure exceeding the predetermined pressure value while it is determined that the temperature information exceeds the predetermined temperature value, wait until the electric power of the fuel cell stack decreases to a predetermined value or until the electrode differential pressure becomes equal to or less than the predetermined pressure value, and perform the first control after the waiting.

10. The fuel cell system according to claim 1, wherein
the control device is configured to:
fully open the bypass valve in the first control; and
adjust an opening degree of the bypass valve in accordance with a power generation amount of the fuel cell stack in the second control.

11. The fuel cell system according to claim 1, wherein
the control device is configured to continue flowing of anode gas to the fuel cell stack during execution of the first control.

* * * * *